(12) United States Patent
Funakoshi

(10) Patent No.: US 12,342,235 B2
(45) Date of Patent: Jun. 24, 2025

(54) BASE STATION DEVICE, SYSTEM, COMPUTER-READABLE STORAGE MEDIUM, FLYING OBJECT, METHOD, MANAGEMENT DEVICE, AND MANAGEMENT METHOD

(71) Applicant: SoftBank Corp., Tokyo (JP)

(72) Inventor: Mizuki Funakoshi, Tokyo (JP)

(73) Assignee: SoftBank Corp., Tokyo (JP)

( * ) Notice: Subject to any disclaimer, the term of this patent is extended or adjusted under 35 U.S.C. 154(b) by 518 days.

(21) Appl. No.: 17/713,214

(22) Filed: Apr. 4, 2022

(65) Prior Publication Data

US 2022/0232444 A1 Jul. 21, 2022

Related U.S. Application Data

(63) Continuation of application No. PCT/JP2020/031355, filed on Aug. 19, 2020.

(30) Foreign Application Priority Data

Nov. 1, 2019 (JP) ................. 2019-200297

(51) Int. Cl.
*H04W 36/22* (2009.01)
*H04W 36/00* (2009.01)
*H04W 36/08* (2009.01)

(52) U.S. Cl.
CPC ..... *H04W 36/22* (2013.01); *H04W 36/00837* (2018.08); *H04W 36/083* (2023.05)

(58) Field of Classification Search
CPC ........... H04W 36/00837; H04W 36/22; H04W 28/02; H04W 36/0094; H04W 36/08;
(Continued)

(56) References Cited

U.S. PATENT DOCUMENTS

2012/0135739 A1 5/2012 Paterson
2012/0302240 A1 11/2012 Tamaki
(Continued)

FOREIGN PATENT DOCUMENTS

EP  2981131 A1    2/2016
EP  3174329 A1 *  5/2017  ............ H04W 24/02
(Continued)

OTHER PUBLICATIONS

WO2018173984A1-English Translated (Year: 2024).*
(Continued)

*Primary Examiner* — Ji-Hae Yea

(57) ABSTRACT

Provided is a base station device configured to form a cell to provide a wireless communication service to a user terminal within the cell, the base station device comprising: a handover threshold storing unit for storing a handover threshold which is set for the user terminal that starts a wireless connection to the base station device, a load determining unit for determining whether a load condition indicating that a load of the base station device is high is satisfied or not, and a handover threshold change unit for changing the handover threshold so as to suppress a handover from the base station device of a user terminal which establishes a wireless connection with the base station device when it is determined that the load condition is satisfied.

14 Claims, 12 Drawing Sheets

(58) Field of Classification Search
CPC ........... H04W 36/0058; H04W 36/083; H04W 36/008375; H04W 36/00838; H04W 36/085; H04W 36/087; H04W 36/13
See application file for complete search history.

(56) References Cited

U.S. PATENT DOCUMENTS

2013/0130693 A1    5/2013  Salvador
2016/0323787 A1*  11/2016  Nanri .................... H04W 36/04
2018/0054749 A1    2/2018  Kim

FOREIGN PATENT DOCUMENTS

| EP | 2783533 B1 | | 8/2017 |
| JP | 2013179406 A | | 9/2013 |
| JP | 2014007593 A | | 1/2014 |
| JP | 2019075717 A | | 5/2019 |
| WO | WO-2018173984 A1 | * | 9/2018 |

OTHER PUBLICATIONS

Supplementary Partial European Search Report for counterpart European Application No. 20881281.8, issued by the European Patent Office on Oct. 26, 2023.
(ISA/237) Written Opinion of the International Search Authority for International Patent Application No. PCT/JP2020/031355, issued/mailed by the Japan Patent Office on Nov. 24, 2020.

* cited by examiner

US 12,342,235 B2

BASE STATION DEVICE, SYSTEM, COMPUTER-READABLE STORAGE MEDIUM, FLYING OBJECT, METHOD, MANAGEMENT DEVICE, AND MANAGEMENT METHOD

The contents of the following Japanese patent application(s) are incorporated herein by reference:
NO. 2019-200297 filed in JP on Nov. 1, 2019
NO. PCT/JP2020/031355 filed in WO on Aug. 19, 2020

BACKGROUND

1. Technical Field

The present invention relates to a base station device, a system, a computer-readable storage medium, a flying object, a method, a management device, and a management method.

2. Related Art

Technology for providing a wireless communication service by a cell formed by a wireless base station is known (for example, see Patent document 1).

PRIOR ART DOCUMENTS

Patent Document

Patent document 1: Japanese Patent Application Publication No. 2019-075717

Technical Problem

It is desirable to provide a technology that can appropriately reduce a load of a wireless base station.

DESCRIPTION OF EXEMPLARY EMBODIMENTS

Hereinafter, the present invention will be described through embodiments of the invention, but the following embodiments do not limit the invention according to claims. In addition, not all combinations of features described in the embodiments are necessarily essential to the solution of the invention.

Figure 1:
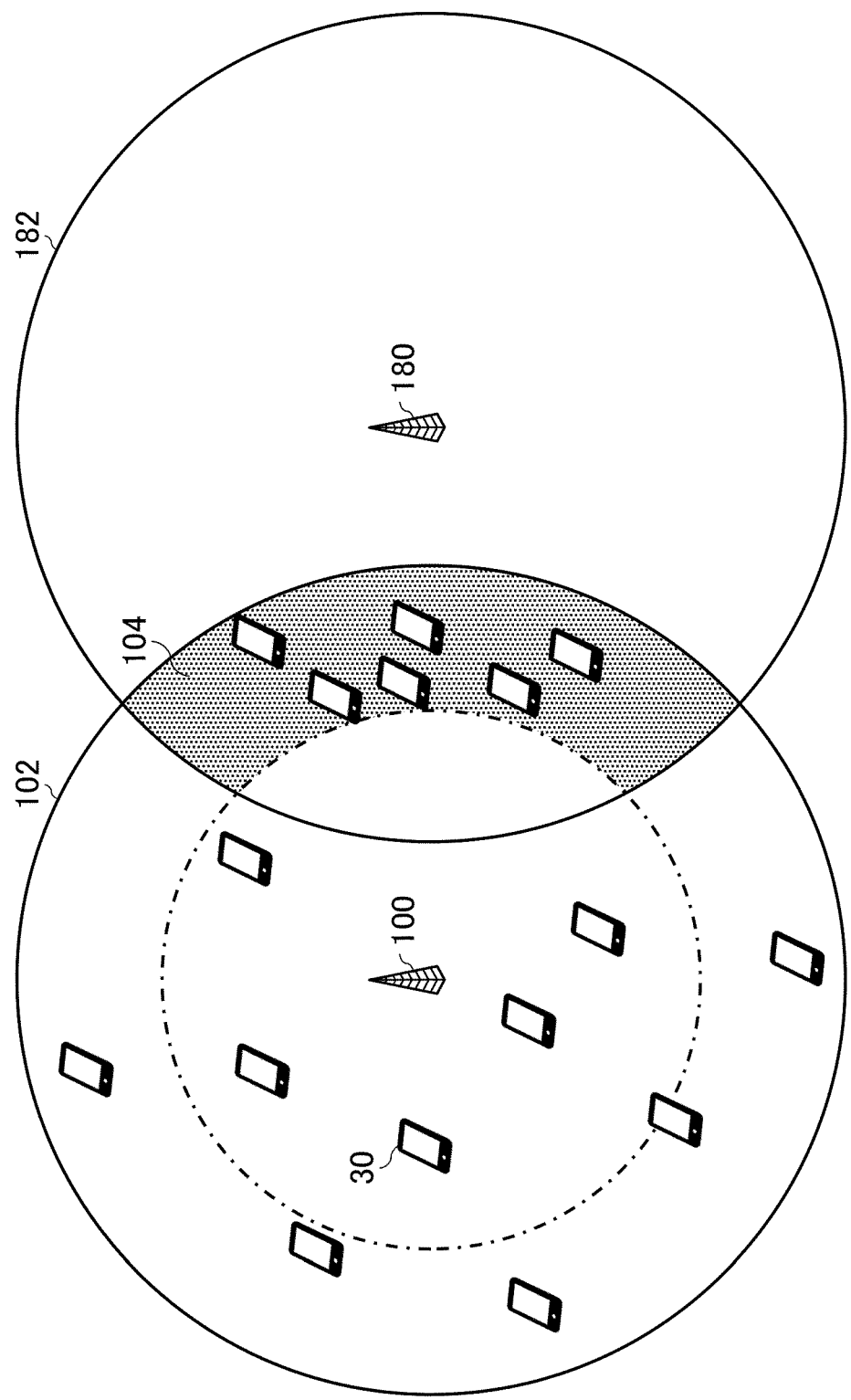
FIG. 1 is a diagram schematically illustrating an example of a wireless base station 100.
Figure 2:
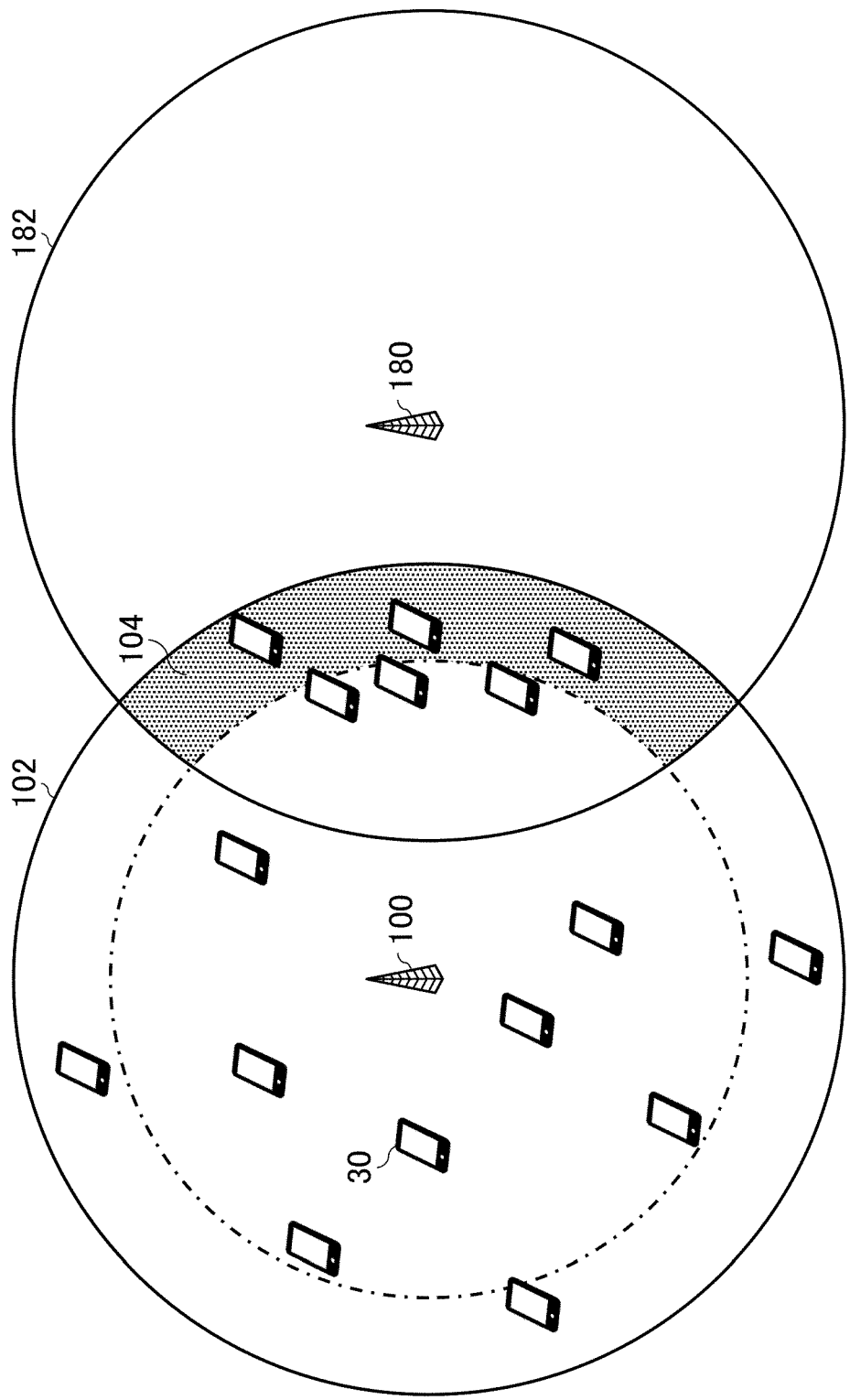
FIG. 2 is a diagram schematically illustrating an example of a wireless base station 100.

FIG. 1 and FIG. 2 are diagrams schematically illustrating an example of a wireless base station 100. A plurality of wireless base stations are positioned around the wireless base station 100, but in FIG. 1 and FIG. 2, only one wireless base station 180 adjacent to the wireless base station 100 is illustrated. The wireless base station 100 may be an example of a base station device. A control device which is mounted on the wireless base station 100 to control an operation of the wireless base station 100 may be an example of the base station device.

The wireless base station 100 forms a cell 102 to provide a wireless communication service to a user terminal 30 within the cell 102. A user terminal 30 may be any terminal as long as it is a communication terminal which can communicate with the wireless base station 100. For example, the user terminal 30 is a mobile phone such as a smartphone. The user terminal 30 may be a tablet terminal, a PC (Personal Computer) and the like. The user terminal 30 may also be a so-called IoT (Internet of Thing) device. The user terminal 30 may include all things corresponding to a so-called IoE (Internet of Everything).

The user terminal 30 may assume a state in which it is existing within the cell 102 but not performing a wireless connection with the wireless base station 100, and a state in which it is existing within the cell 102 and performing a wireless connection with the wireless base station 100 (the former may be described as an idle state, and the latter may be described as a connected state). In FIG. 1 and FIG. 2, only the user terminal 30 existing in the wireless base station 100 is illustrated.

HO available area 104 schematically illustrates an area in which the user terminal 30 can be handed over from the cell 102 of the wireless base station 100 to a cell 182 of the wireless base station 180. A size of the HO available area 104 is changed by changing a handover threshold (may be described as an HO threshold) which is set to the user terminal 30 by the wireless base station 100.

For example, when an event type trigger A2 is set as a timing for the user terminal 30 to transmit a Measurement Report (may be described as an MR) to the wireless base station 100, the lower the HO threshold is, the narrower the HO available area 104 is. Also, when an event type trigger A5 is set, the HO available area 104 becomes narrower as a threshold to be compared with the received radio wave intensity from the serving cell becomes lower and as a threshold to be compared with the received radio wave intensity from the neighbor cell becomes higher.

Also, when an event type trigger A3 is set, the HO available area 104 becomes narrower as an HO threshold indicating an offset becomes higher. In the present embodiment, examples in which the event type trigger A3 is employed as MR transmission timing will be mainly described.

The load of the wireless base station 100 increases by various factors, one of which is a control signal received from the user terminal 30. For example, when the wireless base station 100 receives MRs from numerous user terminals 30, the load for processing the numerous MRs increases. If the load of the wireless base station 100 increases, a situation where the handover of the user terminal 30 cannot be processed occurs, and a situation may occur where a user terminal 30 which cannot be handed over even though it cannot communicate due to an electric field that is really deteriorated and a user terminal 30 which can still communicate but is handed over are interspersed.

The wireless base station 100 according to the present embodiment changes the handover threshold which is set for the user terminal 30 that starts a wireless connection to the wireless base station 100 so that a handover from the wireless base station 100 of the user terminal 30 which establishes a wireless connection with the wireless base station 100 is suppressed when the load of the wireless base station 100 is increased. For example, when the load of the wireless base station 100 is increased, the wireless base station 100 increases the HO threshold for determining whether or not the received radio wave intensity from the neighbor cell is stronger than the received radio wave intensity from the serving cell by the HO threshold or more.

As a specific example, the wireless base station 100 changes the HO threshold to a first HO threshold which is higher than a default value when the load of the wireless base station 100 is increased. In this way, the first HO threshold which is higher than the default value can be set for the user terminal 30 that subsequently starts the wireless connection with the wireless base station 100. The user terminal 30 that starts the wireless connection with the wireless base station 100 is, for example, a user terminal 30 which transits from an idle state to a connected state, a user terminal 30 which is handed over to the cell 102 of the wireless base station 100, and the like. In this way, as illustrated in FIG. 1 and FIG. 2, the HO available area 104 for the user terminal 30 that newly established the wireless connection with the wireless base station 100 can be narrowed, and the number of transmissions of MR to the wireless base station 100 can be reduced. By reducing the number of the MR received by the wireless base station 100, the number of MR processing by the wireless base station 100 can be reduced, and the load of the wireless base station 100 can be reduced. In particular, a handover of a user terminal 30 with a good electric field among the user terminals 30 that reached an HO reference by increasing the HO threshold is suppressed, and the load of the wireless base station 100 can be reduced while allowing a handover of a user terminal 30 with a deteriorated electric field not to be suppressed. By causing targeted user terminals 30 with more deteriorated electric fields to perform the handover, a user terminal 30 which continues to switch between the same cells can be suppressed, and the number of HO perform signals can be significantly reduced.

The wireless base station 100 may reduce the HO threshold when the load of the wireless base station 100 is reduced after increasing the HO threshold. As a specific example, the wireless base station 100 changes the HO threshold to the default value. In this way, by limiting the handover of the user terminal 30 even though the load of the wireless base station 100 is not high, the occurrence of a situation where the user terminal 30 which normally should be handed over cannot be handed over can be suppressed.

The wireless base station 100 may gradually increase the HO threshold in accordance with the increase of the load of the wireless base station 100. For example, the wireless base station 100 changes the HO threshold to the first HO threshold when the load of the wireless base station 100 becomes higher than the first load threshold, and changes the HO threshold to a second HO threshold which is higher than the first HO threshold when the load of the wireless base station 100 becomes higher than a second load threshold which is higher than the first load threshold. In this way, when the load of the wireless base station 100 is further increased for some reasons even though the number of MR receptions are reduced by changing the HO threshold to the first HO threshold, further reduction of the MR reception can contribute to the reduction of the load of the wireless base station 100. The steps for increasing the HO threshold are not limited to two steps, but may be 3 steps or more.

The wireless base station 100 may determine whether the load of the wireless base station 100 is high or not, based on whether the load condition indicating that the load of the wireless base station 100 is high is satisfied or not. For example, the wireless base station 100 determines that the load of the wireless base station 100 is high when the load of the wireless base station 100 is higher than a predetermined load threshold, and determines that the load of the wireless base station 100 is low when the load of the wireless base station 100 is lower than the load threshold. As a specific example, the wireless base station 100 determines that the load of the wireless base station 100 is high when the CPU usage rate of the wireless base station 100 is higher than a predetermined usage rate threshold, and determines that the load of the wireless base station 100 is low when the CPU usage rate of the wireless base station 100 is lower than the usage rate threshold. These thresholds may be set arbitrarily, for example, by an administrator who manages the wireless base station 100.

The wireless base station 100 may pre-store a value of the HO threshold set for the user terminal 30. For example, the wireless base station 100 pre-stores the default value, the first HO threshold and the second HO threshold. These values may be set arbitrarily, for example, by an administrator who manages the wireless base station 100. Also, these values may be determined by a network management system (may be described as NMS (Network Management System)) for managing the wireless base station 100, and notified to the wireless base station 100. The NMS may be an example of a management device.

Figure 3:
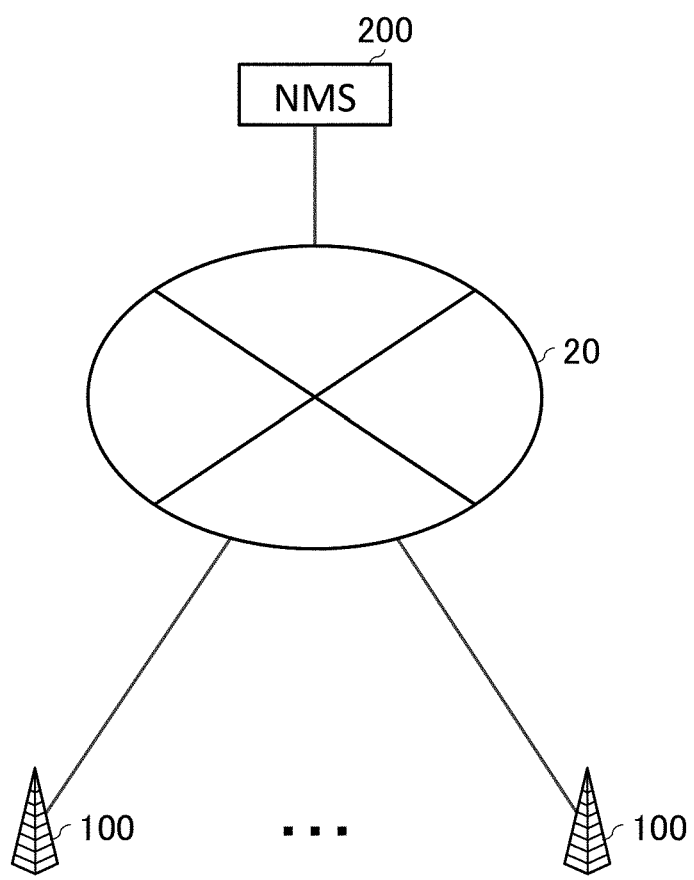
FIG. 3 is a diagram schematically illustrating an example of a system 10.

FIG. 3 is a diagram schematically illustrating an example of a system 10. The system 10 includes a plurality of wireless base stations 100 and an NMS 200.

The plurality of wireless base stations 100 and the NMS 200 are communicating via a network 20. The network 20 includes a mobile communication network. The mobile communication network may comply with any of 3G ($3^{rd}$ Generation) communication scheme, LTE (Long Term Evolution) communication scheme, 5G ($5^{th}$ Generation) communication scheme and a communication scheme after 6G ($6^{th}$ Generation) communication scheme. The network 20 may include the Internet.

Each of the plurality of wireless base stations 100 reports the MR which is a handover trigger (may be described as an HO trigger) of the existing user terminal 30 to the NMS 200. The NMS 200 produces a distribution of the offset value based on the MR which is reported from the wireless base station 100 for each cell. The NMS 200 may compute the offset value based on a cumulative distribution for each cell. The NMS 200 may set HO thresholds at a high load gradually for each cell based on the computed offset value for the wireless base station 100.

When the load of the wireless base station 100 is increased, the wireless base station 100 may set an HO threshold set from the NMS 200 as a HO threshold set for the user terminal 30 that starts the wireless connection to the wireless base station 100. The wireless base station 100 may gradually change the HO threshold according to a load situation of the wireless base station 100, and may continue the change of the HO threshold until the load falls below a reference load. The wireless base station 100 may return the HO threshold to the default value when the load of the wireless base station 100 falls below the reference load.

The NMS 200 may periodically perform an update of the HO threshold. The NMS 200 performs the update of the HO threshold for each predetermined period of time such as on a weekly basis, daily basis, or per hour basis, for example. For example, for each of the plurality of wireless base stations 100, the NMS 200 derives the HO threshold based on the MR received during each period and sets the derived HO threshold.

The NMS 200 may reduce a frequency of the update of the HO threshold if the same tendency is found in continuous periods of time based on past statistics. In this way, the load of the NMS 200 and the wireless base station 100 required for the update can be reduced.

Figure 4:
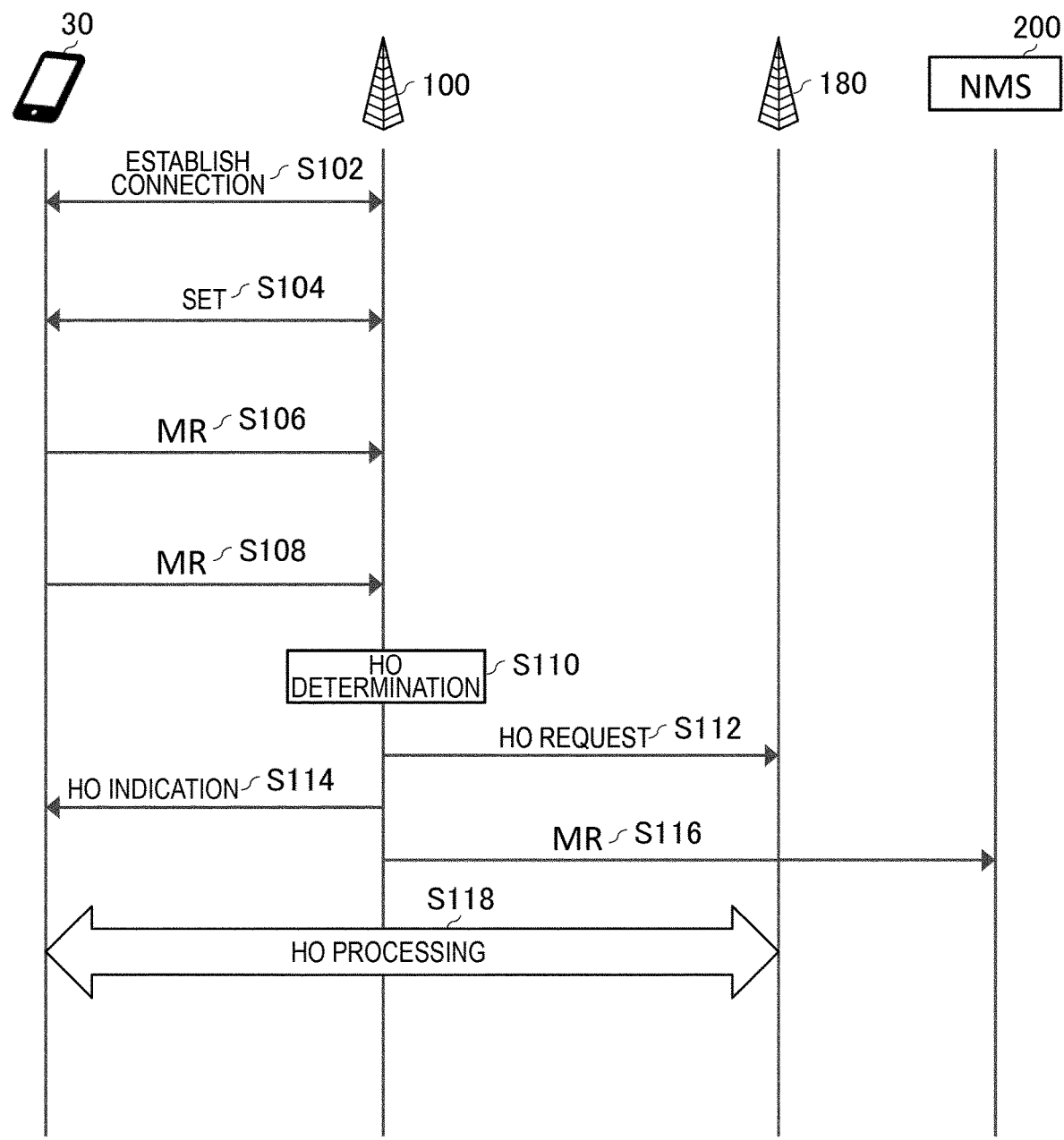
FIG. 4 is a diagram schematically illustrating an example of a flow of processing performed by the system 10.

FIG. 4 is a diagram schematically illustrating an example of a flow of a processing performed by the system 10. Herein, a flow of a processing which starts from establishing a wireless connection with a wireless base station 100 by one user terminal 30 and ends by a handover to a wireless base station 180 which is a neighbor cell of the wireless base station 100 is schematically illustrated.

In step (the step may be described as S for short) 102, the user terminal 30 and the wireless base station 100 establish a connection.

In S104, the wireless base station 100 performs various settings for the user terminal 30. For example, the wireless base station 100 transmits an RRC connection reconfiguration to the user terminal 30, and the user terminal 30 transmits an RRC connection reconfiguration complete to the wireless base station 100.

The wireless base station 100 may cause the user terminal 30 to set the transmission trigger and the HO threshold of the MR by the RRC connection reconfiguration. The wireless base station 100 causes the user terminal 30 to set the transmission trigger of the MR as an event type trigger A3 and set the HO threshold as a default value, for example.

In S106, the user terminal 30 transmits the MR to the wireless base station 100 in accordance with the fact that a difference between received radio wave intensity from the wireless base station 100 and received radio wave intensity from the wireless base station 180 exceeds the HO threshold. The MR may include the received radio wave intensity of the wireless base station 100 and the received radio wave intensity of the wireless base station 180. The wireless base station 100 determines whether to handover the user terminal 30 or not based on the received MR. Herein, the description continues assuming that no handover is determined to be performed.

In S108, the user terminal 30 transmits the MR to the wireless base station 100 in accordance with the fact that a difference between the received radio wave intensity from the wireless base station 100 and the received radio wave intensity from the wireless base station 180 exceeds the HO threshold. In S110, the wireless base station 100 determines to handover the user terminal 30 to the wireless base station 180 based on the MR received in S108.

In S112, the wireless base station 100 transmits, to the wireless base station 180, an HO request for handing over the user terminal 30 to the wireless base station 180. In S114, the wireless base station 100 transmits an HO instruction to the user terminal 30 instructing that it will be handed over to the wireless base station 180. It should be noted that, the case where an X2 handover is performed is illustrated herein, but the wireless base station 100 may perform another handover such as an S1 handover.

In S116, the wireless base station 100 transmits, to the NMS 200, the MR received from the user terminal 30 in S108, wherein the MR is the HO trigger of the user terminal 30. In S118, an HO processing is performed between the user terminal 30 and the wireless base station 180, and the user terminal 30 is handed over to the wireless base station 180.

By transmitting the MR which is the HO trigger to the NMS 200 each time the wireless base station 100 causes the user terminal 30 to be handed over, the NMS 200 can collect a plurality of MRs. The NMS 200 may derive the HO threshold based on the plurality of MRs that are collected.

Figure 5:
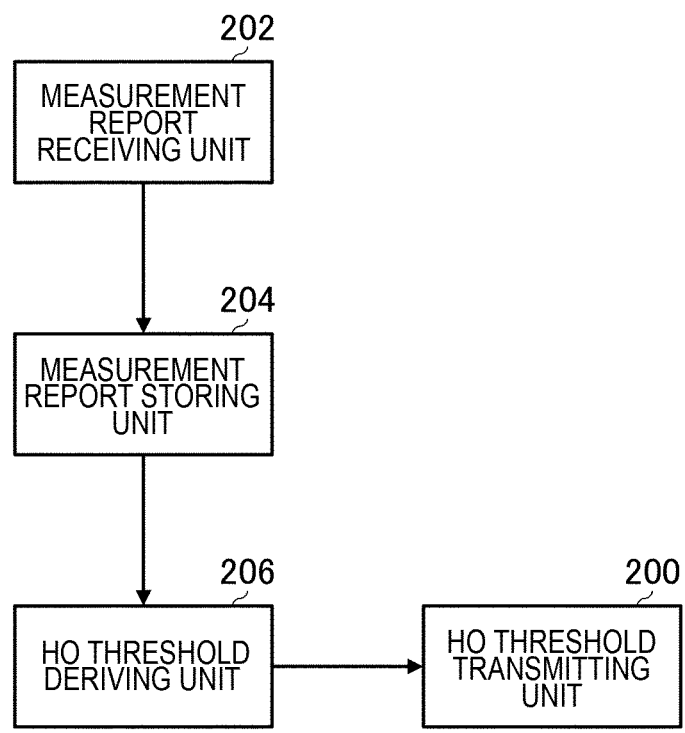
FIG. 5 is a diagram schematically illustrating an example of a functional configuration of an NMS 200.

FIG. 5 is a diagram schematically illustrating an example of a functional configuration of an NMS 200. The NMS 200 includes a measurement report receiving unit 202, a measurement report storing unit 204, an HO threshold deriving unit 206, and an HO threshold transmitting unit 208.

The measurement report receiving unit 202 receives, from the wireless base station 100, an MR in the case where it is determined that the wireless base station 100 causes the user terminal 30 to be handed over based on the MR from the user terminal 30 existing in the wireless base station 100 (the MR which is the HO trigger).

The measurement report storing unit 204 stores, in association with base station identification information of the wireless base station 100, the MR that the measurement report receiving unit 202 received from the wireless base station 100. The measurement report storing unit 204 stores, in association with base station identification information of each of the plurality of wireless base station 100, the MR that the measurement report receiving unit 202 received from each of the plurality of wireless base station 100.

The HO threshold deriving unit 206 derives, for each of the plurality of wireless base stations 100, an HO threshold based on the plurality of MRs corresponding to the wireless base stations 100 which are stored in the measurement report storing unit 204.

The HO threshold deriving unit 206 may derive the HO threshold for each transmission trigger of the MRs. For example, when an event type trigger A3 is employed, the HO threshold deriving unit 206 derives the HO threshold based on the received radio wave intensity from the serving cell and the received radio wave intensity from the neighbor cell included in the MRs. The HO threshold deriving unit 206 may derive the HO threshold based on a differential between the received radio wave intensity from the serving cell and the received radio wave intensity from the neighbor cell. The HO threshold deriving unit 206 derives the HO threshold based on a cumulative distribution of a plurality of differentials acquired from the plurality of MRs, for example.

The HO threshold deriving unit 206 may derive a value of a differential among the plurality of differentials, in which the cumulative distribution exceeds a predetermined first percentage, as a first HO threshold, and derive a value of a differential among the plurality of differentials, in which the cumulative distribution exceeds a second percentage, as a second HO threshold, for example. The second percentage is greater than the first percentage. The first percentage and the second percentage may be set arbitrarily, for example, by an administrator and the like of the NMS 200.

Also, for example, when an event type trigger A2 is employed, the HO threshold deriving unit 206 derives the HO threshold based on the received radio wave intensity from the serving cell included in the MRs. The HO threshold deriving unit 206 derives the HO threshold based on a cumulative distribution of the received radio wave intensity from the serving cell included in the plurality of MRs, for example. The HO threshold deriving unit 206 may derive a value of received radio wave intensity among the plurality of received radio wave intensities, in which the cumulative distribution exceeds a predetermined first percentage, as a first HO threshold, and derive a value of received radio wave intensity among the plurality of received radio wave intensities, in which the cumulative distribution exceeds a second percentage which is greater than the first percentage, as a second HO threshold, for example.

Also, for example, when an event type trigger A5 is employed, the HO threshold deriving unit 206 derives an HO threshold for the serving cell and an HO threshold for the neighbor cell based on the received radio wave intensity from the serving cell and the received radio wave intensity from the neighbor cell included in the MR. The HO threshold deriving unit 206 derives an HO threshold for the serving cell and an HO threshold for the neighbor cell based on the cumulative distribution of the received radio wave intensity from the serving cell included in the plurality of MRs and a cumulative distribution of received radio wave intensity from the neighbor cell included in the plurality of MRs, for example.

The HO threshold deriving unit 206 may intermittently derive the HO threshold according to a predetermined timing. The HO threshold deriving unit 206 periodically derives the HO threshold according to a predetermined period, for example. The HO threshold deriving unit 206 performs the derivation of the HO threshold for each predetermined period of time such as on a weekly basis, daily basis, or per hour basis, for example. The HO threshold deriving unit 206 derives the HO threshold based on the MR received during each period, for example.

The HO threshold deriving unit 206 may reduce a frequency of the derivation of the HO threshold if the same tendency is found in continuous periods of time based on past statistics. For example, the HO threshold deriving unit 206 changes a derivation timing of the HO threshold from a daily basis to a weekday basis and Saturday, Sunday and National holiday basis, in the case in which the HO threshold is derived on a daily basis and in which a difference between the HO thresholds derived on weekdays are within a predetermined range, a difference between the HO thresholds derived on Saturday, Sunday and National holiday are within a predetermined range, and a difference between the HO thresholds derived on weekdays and the HO thresholds derived on Saturday, Sunday and National holiday exceeds a predetermined range. In this way, the load of the NMS 200 and the wireless base station 100 required for the update can be appropriately reduced.

The HO threshold transmitting unit 208 transmits the HO threshold derived by the HO threshold deriving unit 206 to the wireless base station 100. The HO threshold transmitting unit 208 transmits, to each of the plurality of wireless base stations 100, the HO threshold derived by the HO threshold deriving unit 206 for each of the plurality of wireless base stations 100.

Figure 6:
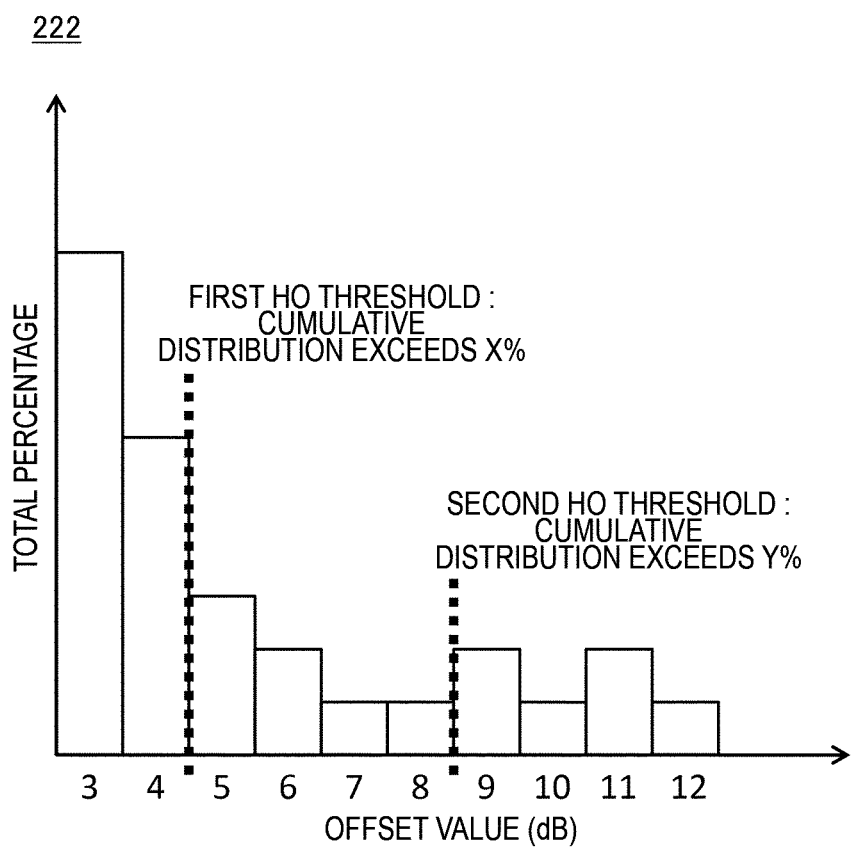
FIG. 6 is a diagram schematically illustrating an example of a cumulative distribution graph 222.

FIG. 6 is a diagram schematically illustrating an example of a cumulative distribution graph 222. Herein, examples in which the event type trigger A3 is employed as a transmission trigger of the MR will be described. The horizontal axis represents an offset value indicating a differential between the received radio wave intensity from the serving cell and the received radio wave intensity from the neighbor cell included in the MR. The vertical axis represents a percentage of each of the plurality of offset values relative to the total.

In the example indicated in FIG. 6, the NMS 200 may assume 5 dB that is an offset value for which the cumulative distribution exceeds X % as a first HO threshold, and assume 9 dB that is an offset value whose cumulative distribution exceeds Y % as a second HO threshold. The values of X and Y may be set arbitrarily, for example, by an administrator and the like of the NMS 200.

Figure 7:
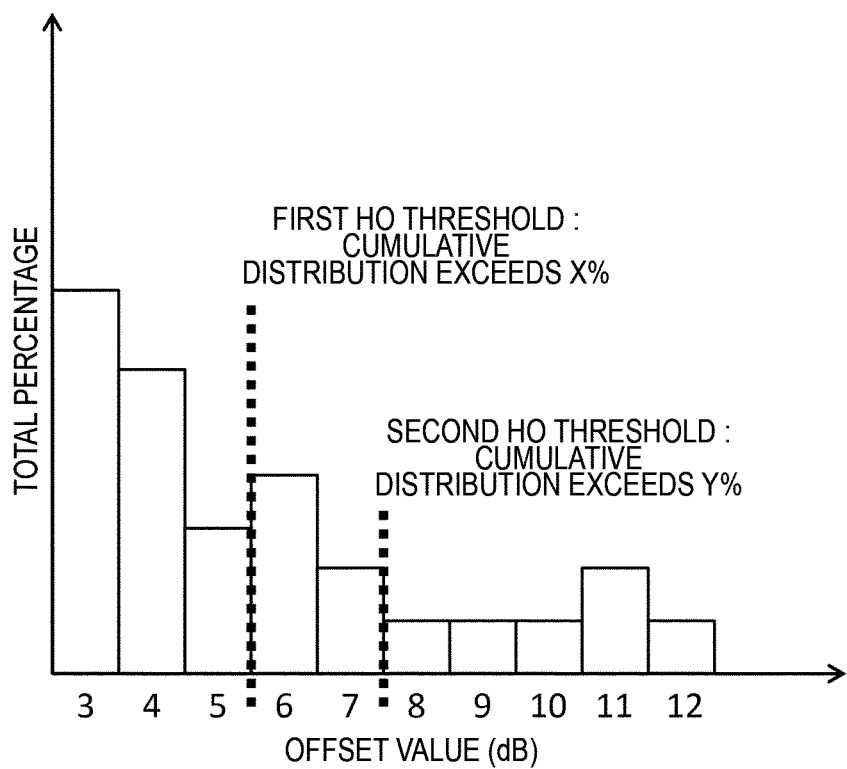
FIG. 7 is a diagram schematically illustrating an example of a cumulative distribution graph 224.

FIG. 7 is a diagram schematically illustrating an example of a cumulative distribution graph 224. The cumulative distribution graph 224 corresponds to a cell different from the cumulative distribution graph 222.

In the example indicated in FIG. 7, the NMS 200 assumes 6 dB that is an offset value whose cumulative distribution exceeds X % as a first HO threshold, and assume 8 dB that is an offset value whose cumulative distribution exceeds Y % as a second HO threshold. As illustrated in FIG. 6 and FIG. 7, since the distribution of the MR is different for each cell, different HO thresholds may be derived for each cell.

Figure 8:
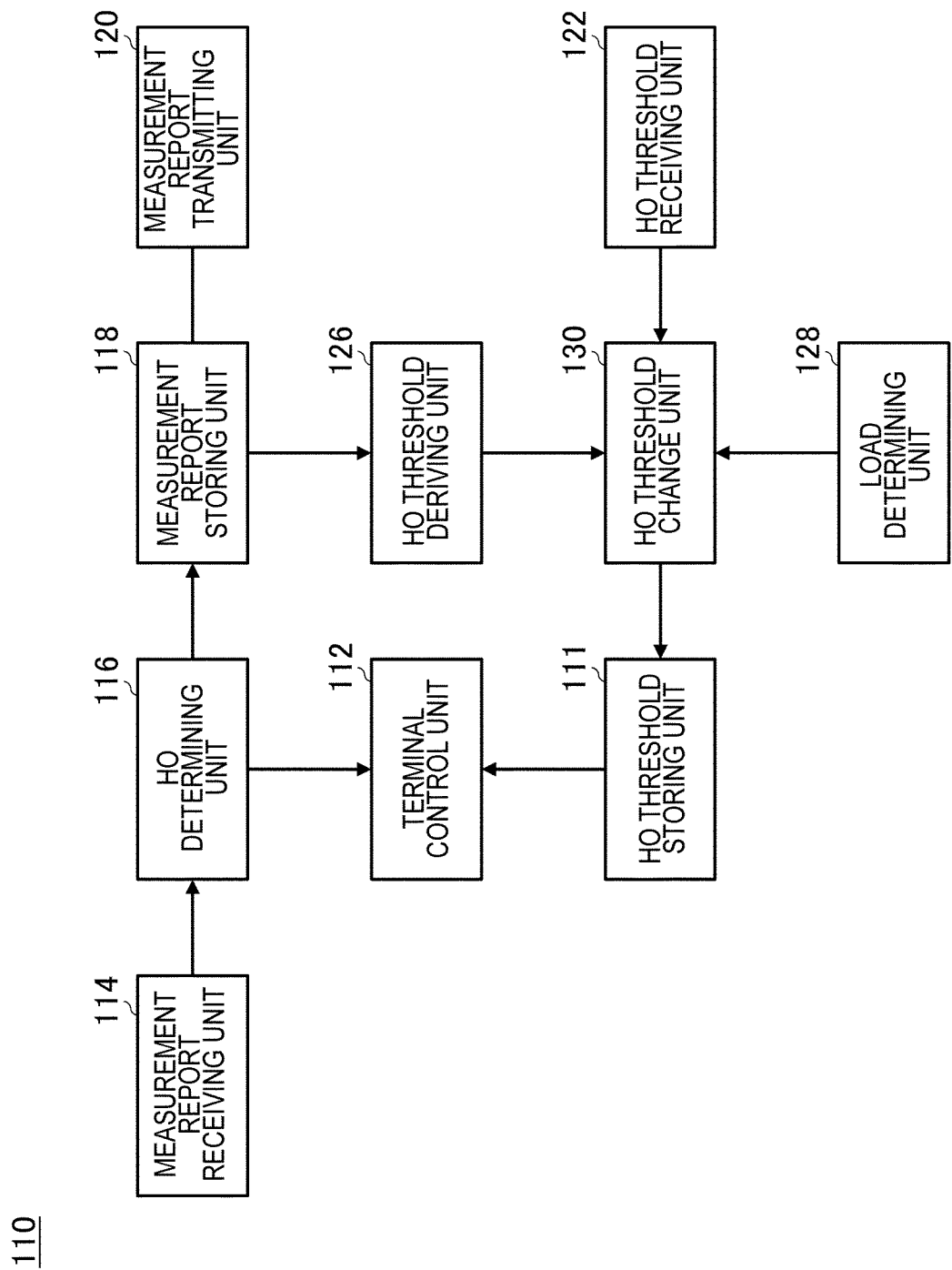
FIG. 8 is a diagram schematically illustrating an example of a functional configuration of a base station device 110.

FIG. 8 is a diagram schematically illustrating an example of a functional configuration of a base station device 110. The base station device 110 is mounted on the wireless base station 100. The base station device 110 includes an HO threshold storing unit 111, a terminal control unit 112, a measurement report receiving unit 114, an HO determining unit 116, a measurement report storing unit 118, a measurement report transmitting unit 120, an HO threshold receiving unit 122, an HO threshold deriving unit 126, a load determining unit 128, and an HO threshold change unit 130. It should be noted that it is not always necessary for the base station device 110 to include all these components.

The HO threshold storing unit 111 stores the HO threshold set for the user terminal 30 that starts a wireless connection to the base station device 110. The HO threshold storing unit 111 may store the plurality of HO thresholds which corresponds to the height of the load of the base station device 110.

The HO threshold storing unit 111 may store the HO threshold for each transmission trigger of the MRs. The HO threshold storing unit 111 stores, for example, an HO threshold for an event type trigger A3, an HO threshold for an event type trigger A2, an HO threshold for an event type trigger A5.

The terminal control unit 112 performs various controls with the user terminal 30. The terminal control unit 112 establishes a communication connection with the user terminal 30, for example. Also, the terminal control unit 112 performs various settings for the user terminal 30, for example. The terminal control unit 112 may set a transmission trigger of the MR for the user terminal 30. Also, the terminal control unit 112 may set the HO threshold for the user terminal 30. The terminal control unit 112 transmits, for example to the user terminal 30 that starts a wireless connection to the base station device 110, a transmission trigger of a preset MR, and an HO threshold to be set for the user terminal 30 that starts a wireless connection to the base station device 110, the HO threshold being stored in the HO threshold storing unit 111, and then sets the HO threshold for the user terminal 30.

The measurement report receiving unit 114 receives the MR from the user terminal 30 existing in the wireless base station 100. The measurement report receiving unit 114 receives the MR transmitted by the user terminal 30, in accordance with the transmission trigger which is set by the terminal control unit 112.

The HO determining unit 116 determines, when the measurement report receiving unit 114 receives the MR, whether or not to handover the user terminal 30 which has transmitted the MR, based on the MR. The HO determining unit 116 may determine whether or not to handover the user terminal 30 based on the MR as with the existing wireless base station.

When the HO determining unit 116 determines to handover the user terminal 30, the terminal control unit 112 performs control to handover the user terminal 30. The terminal control unit 112 may be an example of a handover control unit.

A handover manner may be similar to the existing manner. For example, when performing an X2 handover, the terminal control unit 112 transmits an HO request to the wireless base station 100 which is a handover destination, and transmits an HO instruction to the user terminal 30. The terminal control unit 112 transmits the HO request to an MME (Mobility Management Entity) when performing an S1 handover, for example.

The measurement report storing unit 118 stores the MR in the case where the HO determining unit 116 is determined to handover the user terminal 30. The measurement report transmitting unit 120 transmits the MR which is stored in the measurement report storing unit 118 to the NMS 200.

The measurement report transmitting unit 120 may transmit the MR to the NMS 200 according to a preset timing. The measurement report transmitting unit 120 transmits the MR to the NMS 200 every time the measurement report storing unit 118 stores the MR, for example. Also, for example, for each predetermined period of time, the measurement report transmitting unit 120 transmits, to the NMS 200, the MR which is stored by the measurement report storing unit 118 during each period.

It should be noted that the measurement report storing unit 118 may store all the MRs received by the measurement report receiving unit 114 and the measurement report transmitting unit 120 may transmit only MRs that are the HO triggers to the NMS 200, among the MRs stored in the measurement report storing unit 118.

The HO threshold receiving unit 122 receives, from the NMS 200, the HO threshold derived by the NMS 200 based on the MR which is transmitted by the measurement report transmitting unit 120. The NMS 200 may derive the HO threshold for each transmission trigger of the MR and transmit it to the base station device 110.

The HO threshold deriving unit 126 derives the HO threshold based on the MR stored in the measurement report storing unit 118. The HO threshold deriving unit 126 may derive the HO threshold using a similar method as the NMS 200.

The load determining unit 128 determines whether a load condition indicating that a load of the base station device 110 is high is satisfied or not. The load determining unit 128 determines that the load condition is satisfied when the load of the base station device 110 is higher than a predetermined load threshold, and determines that the load condition is not satisfied when the load of the base station device 110 is lower than the load threshold, for example. The load determining unit 128 may determine that the load condition is satisfied when a CPU usage rate of the base station device 110 is higher than a predetermined usage rate threshold, and determine that the load condition is not satisfied when the CPU usage rate of the base station device 110 is lower than the usage rate threshold.

When the load determining unit 128 determines that the load condition is satisfied, the HO threshold change unit 130 changes the HO threshold set for the user terminal 30 that starts a wireless connection to the base station device 110, which is stored in the HO threshold storing unit 111, such that a handover from the base station device 110 of the user terminal 30 which establishes the wireless connection between the base station device 110 is suppressed.

The HO threshold change unit 130 may gradually change the HO threshold until the load of the base station device 110 becomes lower than a predetermined load threshold when the load of the base station device 110 is higher than the predetermined load threshold. In this way, the load of the base station device 110 can be appropriately reduced to the predetermined load without excessively suppressing the handover of the user terminal 30.

The HO threshold change unit 130 may change the HO threshold to the HO threshold which corresponds to the height of the load of the base station device 110. In this way, the appropriate HO threshold can be set for the user terminal 30, the appropriate HO threshold corresponding to a situation of the load of the base station device 110.

When an event type trigger A3 is employed as the transmission trigger of the MR, the HO threshold change unit 130 increases the HO threshold for determining whether or not received radio wave intensity from a neighbor cell is stronger than received radio wave intensity from a serving cell by the HO threshold or more. The HO threshold change unit 130 may change the HO threshold from a default value to a first HO threshold which is higher than the default value. The HO threshold change unit 130 uses a first HO threshold which is preset by an administrator and the like of the wireless base station 100, for example. Also, the HO threshold change unit 130 may use a first HO threshold that the HO threshold receiving unit 122 received from the NMS 200. Also, the HO threshold change unit 130 may use a first HO threshold derived from the HO threshold deriving unit 126. The HO threshold change unit 130 may change the HO threshold to the default value when the load determining unit 128 determines that the load condition is not satisfied after the HO threshold is changed to the first HO threshold. The HO threshold change unit 130 may change the HO threshold into the first HO threshold when the load of the base station device 110 is higher than a first load threshold and lower than a second load threshold, and the HO threshold change unit 130 may change the HO threshold to a second HO threshold which is higher than the first HO threshold when the load of the base station device 110 is higher than the second load threshold. The HO threshold change unit 130 uses a second HO threshold which is preset by an administrator and the like of the wireless base station 100, for example. Also, the HO threshold change unit 130 may use a second HO threshold that the HO threshold receiving unit 122 received from the NMS 200. Also, the HO threshold change unit 130 may use a second HO threshold derived from the HO threshold deriving unit 126.

When an event type trigger A2 is employed as the transmission trigger of the MR, the HO threshold change unit 130 reduces the HO threshold for determining whether or not received radio wave intensity from the serving cell is lower than the HO threshold. The HO threshold change unit 130 may change the HO threshold from a default value to a first HO threshold which is lower than the default value. The HO threshold change unit 130 uses a first HO threshold which is preset by an administrator and the like of the wireless base station 100, for example. Also, the HO threshold change unit 130 may use a first HO threshold that the HO threshold receiving unit 122 received from the NMS 200. Also, the HO threshold change unit 130 may use a first HO threshold derived from the HO threshold deriving unit 126. The HO threshold change unit 130 may change the HO threshold to the default value when the load determining unit 128 determines that the load condition is not satisfied after the HO threshold is changed to the first HO threshold. The HO threshold change unit 130 may change the HO threshold into the first HO threshold when the load of the base station device 110 is higher than a first load threshold and lower than a second load threshold, and the HO threshold change unit 130 may change the HO threshold to a second HO threshold which is higher than the first HO threshold when the load of the base station device 110 is lower than the second load threshold. The HO threshold change unit 130 uses a second HO threshold which is preset by an administrator and the like of the wireless base station 100, for example. Also, the HO threshold change unit 130 may use a second HO threshold that the HO threshold receiving unit 122 received from the NMS 200. Also, the HO threshold change unit 130 may use a second HO threshold derived from the HO threshold deriving unit 126.

When an event type trigger A5 is employed as the transmission trigger of the MR, the terminal control unit 112 reduces a serving cell HO threshold for determining whether the received radio wave intensity from a serving cell is lower than the serving cell HO threshold or not, and increases a neighbor cell HO threshold for determining whether received radio wave intensity from a neighbor cell is higher than the neighbor cell HO threshold or not. The terminal control unit 112 may change the serving cell HO threshold from the default value to a first serving cell HO threshold which is lower than the default value, and change the neighbor cell HO threshold from the default value to a first neighbor cell HO threshold which is higher than the default value. The HO threshold change unit 130 uses the first serving cell HO threshold and the first neighbor cell HO threshold which are preset by an administrator and the like of the wireless base station 100, for example. Also, the HO threshold change unit 130 may use the first serving cell HO threshold and the first neighbor cell HO threshold that the HO threshold receiving unit 122 received from the NMS 200. Also, the HO threshold change unit 130 may use the first serving cell HO threshold and the first neighbor cell HO threshold derived by the HO threshold deriving unit 126. The HO threshold change unit 130 may change the serving cell HO threshold to the default value and change the neighbor cell HO threshold to the default value when the load determining unit 128 determines that the load condition is not satisfied after transmitting a changing instruction. The HO threshold change unit 130 may change the serving cell HO threshold to the first serving cell HO threshold when the load of the base station device 110 is higher than the first load threshold and lower than the second load threshold, change the neighbor cell HO threshold to the first neighbor cell HO threshold, change the serving cell HO threshold to a second serving cell HO threshold which is lower than the first serving cell HO threshold when the load of the base station device 110 is higher than the second load threshold, and change the neighbor cell HO threshold to a second neighbor cell HO threshold which is higher than the first neighbor cell HO threshold. The HO threshold change unit 130 uses the second serving cell HO threshold and the second neighbor cell HO threshold which are preset by an administrator and the like of the wireless base station 100, for example. Also, the HO threshold change unit 130 may use the second serving cell HO threshold and the second neighbor cell HO threshold that the HO threshold receiving unit 122 received from the NMS 200. Also, the HO threshold change unit 130 may use the second serving cell HO threshold and the second neighbor cell HO threshold derived by the HO threshold deriving unit 126.

Figure 9:
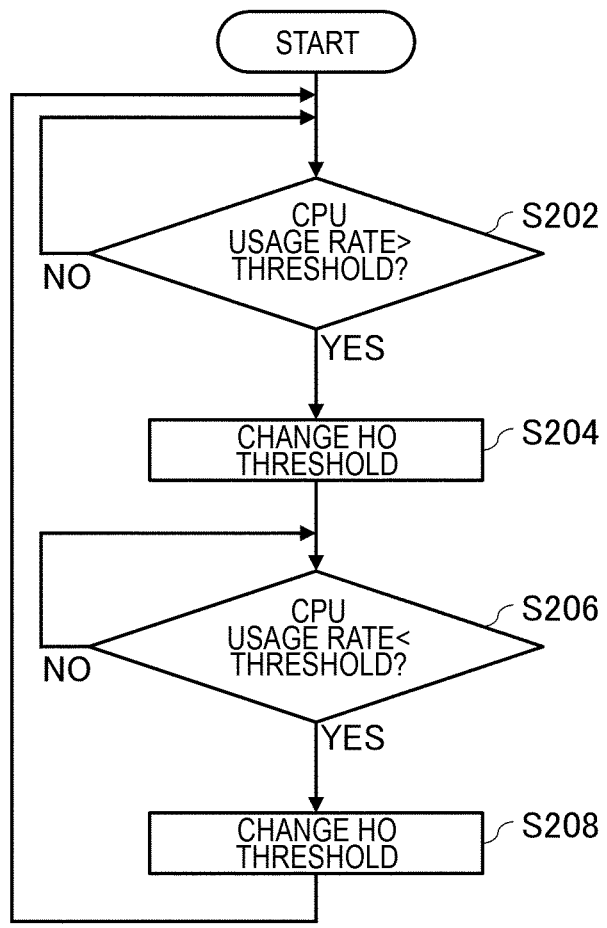
FIG. 9 is a diagram schematically illustrating an example of a flow of processing performed by the base station device 110.

FIG. 9 is a diagram schematically illustrating an example of a flow of processing performed by the base station device 110. Herein, a state in which a plurality of user terminals 30 are existing in the base station device 110, an event type trigger A3 is employed as the transmission trigger of the MR, and an HO threshold set for the user terminal 30 that starts a wireless connection to the base station device 110 is set as a default value is described as an initialized state.

In S202, the load determining unit 128 determines whether a CPU usage rate of the base station device 110 is higher than a threshold or not. If the CPU usage rate of the base station device 110 is higher than a threshold is determined to be higher, the process proceeds to S204.

In S204, the HO threshold change unit 130 changes the HO threshold set for the user terminal 30 that starts a wireless connection to the base station device 110 to a value higher than the default value. After the change, the HO threshold is set for the user terminal 30 to be a value higher than the default value that starts a wireless connection to the base station device 110, and the transmission of the MR from the user terminal 30 which newly established a wireless connection with the base station device 110 is suppressed.

In S206, the load determining unit 128 determines whether a CPU usage rate of the base station device 110 is lower than a threshold or not. If the CPU usage rate of the base station device 110 is lower than a threshold is determined to be higher, the process proceeds to S208.

In S208, the HO threshold change unit 130 changes the HO threshold set for the user terminal 30 that starts a wireless connection to the base station device 110 to the default value. The process returns to S202. The base station device 110 may terminate the process indicated in FIG. 9 according to an instruction by an administrator of the base station device 110, for example.

Figure 10:
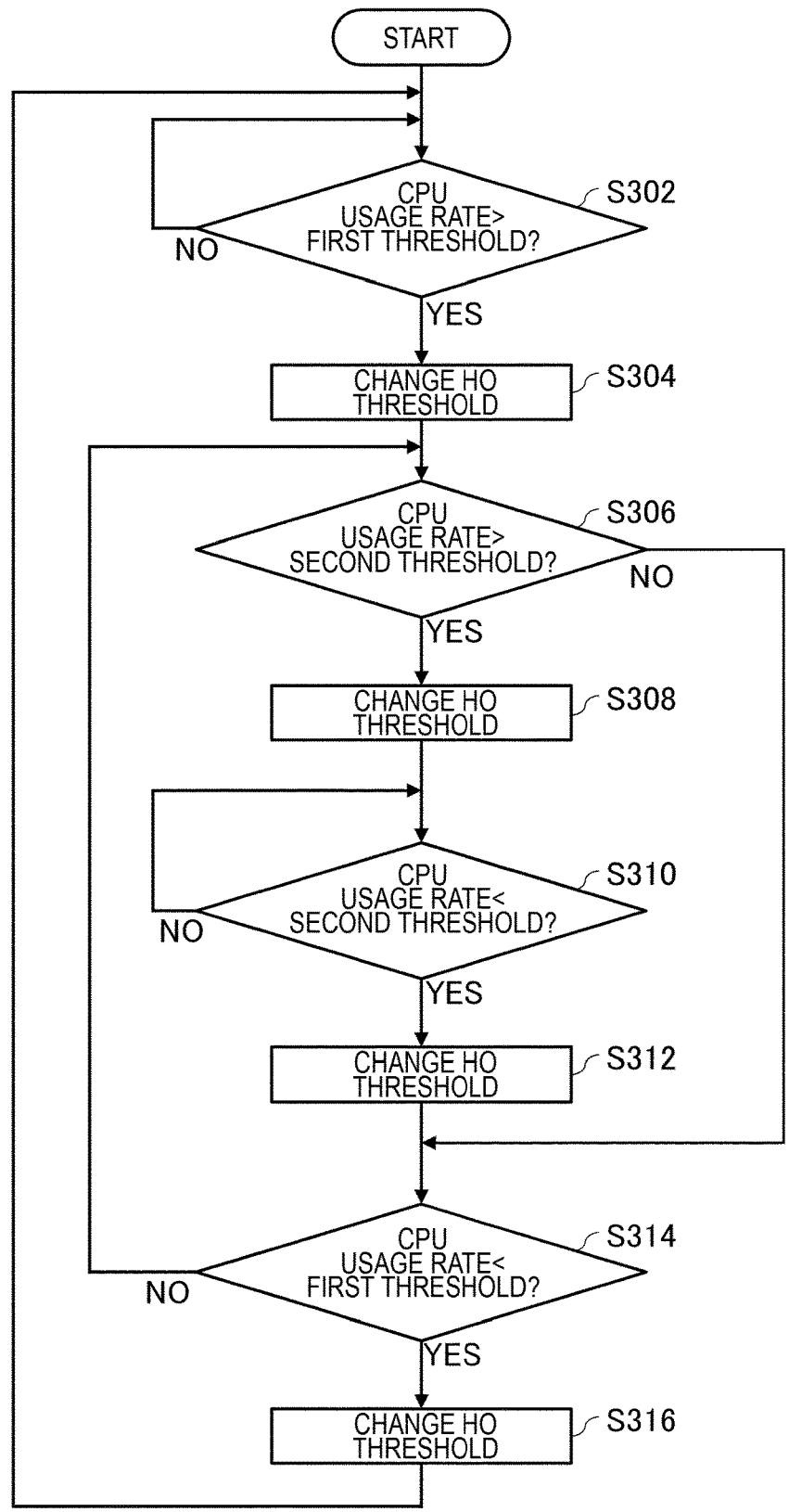
FIG. 10 is a diagram schematically illustrating an example of a flow of processing performed by the base station device 110.

FIG. 10 is a diagram schematically illustrating an example of a flow of processing performed by the base station device 110. Herein, a state in which a plurality of user terminals 30 are existing in the base station device 110, an event type trigger A3 is employed as the transmission trigger of the MR, and an HO threshold set for the user terminal 30 that starts a wireless connection to the base station device 110 is set as a default value is described as an initialized state.

In S302, the load determining unit 128 determines whether a CPU usage rate of the base station device 110 is higher than a first threshold or not. If the CPU usage rate of the base station device 110 is higher than a threshold is determined to be higher, the process proceeds to S304.

In S304, the HO threshold change unit 130 changes the HO threshold set for the user terminal 30 that starts a wireless connection to the base station device 110 to a first HO threshold higher than the default value.

In S306, the load determining unit 128 determines whether a CPU usage rate of the base station device 110 is higher than a second threshold which is higher than the first threshold or not. If the CPU usage rate of the base station device 110 is determined to be higher than the second threshold, the process proceeds to S308. If the CPU usage rate of the base station device 110 is not determined to be higher than the second threshold, the process proceeds to S312. In S308, the HO threshold change unit 130 changes the HO threshold set for the user terminal 30 that starts a wireless connection to the base station device 110 to a second HO threshold higher than the first HO threshold.

In S310, the load determining unit 128 determines whether a CPU usage rate of the base station device 110 is lower than the second threshold or not. If the CPU usage rate of the base station device 110 is lower than a threshold is determined to be higher, the process proceeds to S312. In S312, the HO threshold change unit 130 changes the HO threshold set for the user terminal 30 that starts a wireless connection to the base station device 110 to the first HO threshold.

In S314, the load determining unit 128 determines whether a CPU usage rate of the base station device 110 is lower than the first threshold or not. If the CPU usage rate of the base station device 110 is determined to be lower than the first threshold, the process proceeds to S316. If the CPU usage rate of the base station device 110 is not determined to be lower than the first threshold, the process returns to S306. In S316, the HO threshold change unit 130 changes the HO threshold set for the user terminal 30 that starts a wireless connection to the base station device 110 to the default value. The process returns to S302. The base station device 110 may terminate the process indicated in FIG. 10 according to an instruction by an administrator of the base station device 110, for example.

Figure 11:
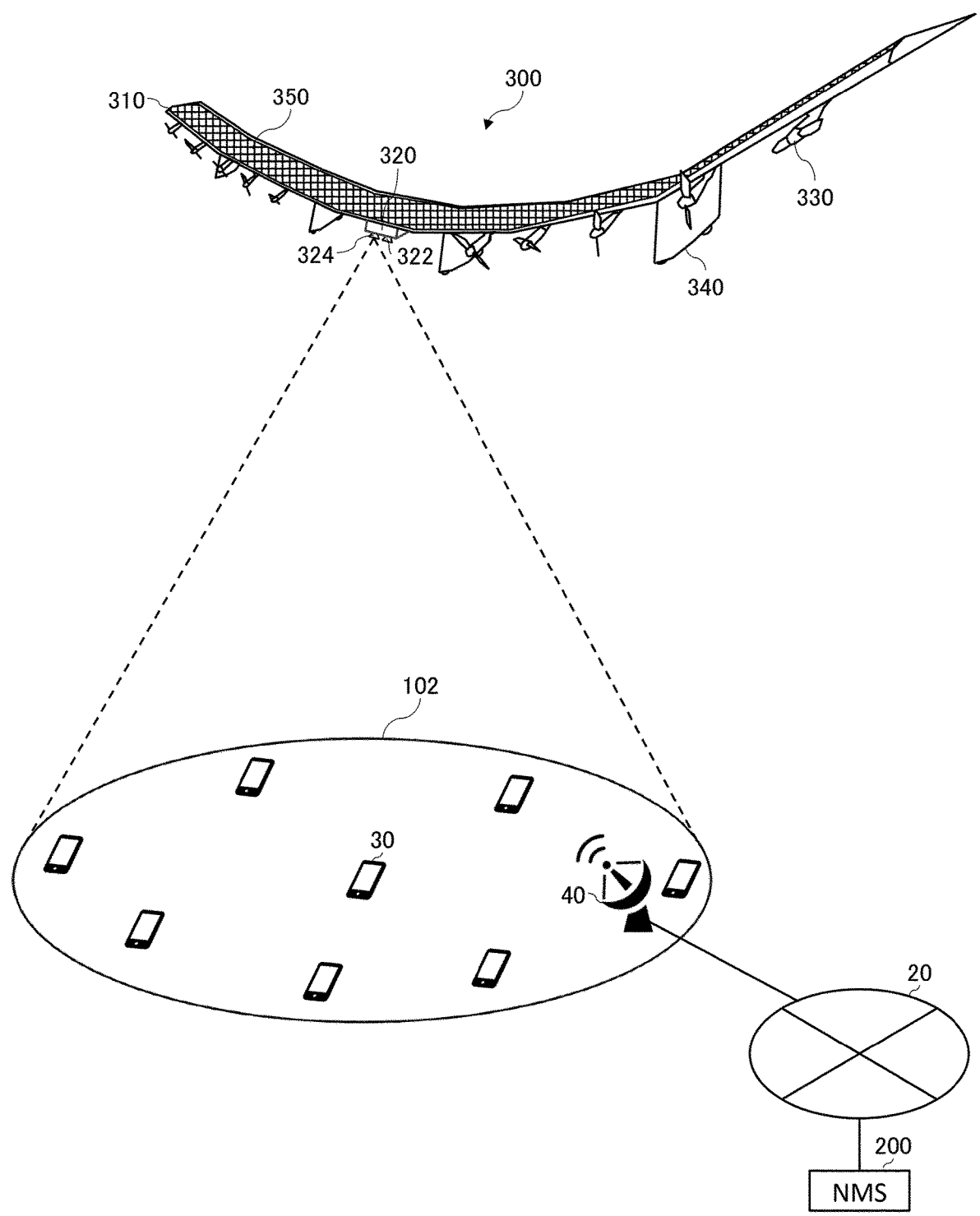
FIG. 11 is a diagram schematically illustrating an example of a HAPS 300.

FIG. 11 is a diagram schematically illustrating HAPS (High Altitude Platform Station) 300. The HAPS 300 may be an example of a flying object. The HAPS 300 includes a vehicle 310, a central part 320, a propeller 330, a pod 340, and a solar panel 350. The central part 320 has a flight control device and a base station device 110 which are not shown.

An electrical power generated by the solar panel 350 is stored in one or more batteries positioned in at least any of the vehicle 310, the central part 320, and the pod 340. The electrical power stored in the battery is utilized by each component included in the HAPS 300.

The flight control device controls the flight of the HAPS 300. The flight control device controls the flight of the HAPS 300 by controlling the rotation of the propeller 330, for example. Also, the flight control device may control the flight of the HAPS 300 by changing the angle of the flap or the elevator which are not shown. The flight control device may include various sensors such as a positioning sensor for example a GPS sensor and the like, a gyrosensor, and an acceleration sensor and the like, to manage the position, the moving direction, and the moving speed of the HAPS 300.

The base station device 110 provides a wireless communication service to the user terminal 30 on the ground by using an FL (Feeder Link) antenna 322, and an SL (Service Link) antenna 324. The FL antenna 322 is an antenna for a feeder link. The base station device 110 forms a feeder link between itself and a terrestrial gateway 40 by the FL antenna 322.

The SL antenna 324 is an antenna for a service link. The SL antenna 324 may be an antenna with lower directivity than the FL antenna 322. The base station device 110 forms a cell 102 on the ground by the SL antenna 324.

The base station device 110 establishes a feeder link between itself and each gateway 40 positioned at each location on the ground and then communicates with a network 20 on the ground via the gateway 40, for example. The base station device 110 may communicate with an NMS 200 via the gateway 40 and the network 20. The HAPS 300 covers a terrestrial area by the cell 102 while performing circular flight along a circular flight path over the terrestrial area to be covered and adjusting a beam direction determined by the FL antenna 322 and the SL antenna 324, for example. Besides of precise circles and ovals and the like, the flight path may be shaped like a number 8 and the like. The adjustment of the beam direction may be performed by at least any of a physical orientation change of the antenna and beamforming.

In the case of the HAPS 300, since a range of the terrestrial area covered by the cell 102 is broader compared to a terrestrial wireless base station, and an electric field variation in the terrestrial area becomes intense by a vehicle oscillation due to the flight, more control signals is generated compared to the terrestrial wireless base station. Therefore, the effect of changing, by the base station device 110, the HO threshold in accordance with the load of the base station device 110 is more significant.

Also, in the case of the HAPS 300, the appropriate HO threshold is likely to vary for each HAPS 300, depending on positioning conditions of the cell in the covering target area, wind conditions in the flight area, performance errors of the vehicle, communication traffic tendency in the covering target area, seasonal variations, or the like. In contrast, in the present embodiment, since the HO threshold is derived for each HAPS 300, the HO threshold suitable for each HAPS 300 can be applied and the load reduction can be appropriately realized.

Also, in the case of the HAPS 300, it is predicted that the value distribution of offset values in the MR which is the HO trigger will become wider. Accordingly, a configuration with good time efficiency can be realized compared to the case in which the HO threshold is gradually adjusted, by aggregating the distribution of the offset values in the MR which is the HO trigger, derive the HO threshold based on the cumulative distribution in advance, and applying, according to the load of the base station device 110, the HO threshold which is derived in advance.

Also, in the case of the HAPS 300, computing resources are limited and the available electrical power is limited compared to the terrestrial wireless base station, but the message exchange between the base station device 110 and the NMS 200 can be reduced and a countermeasure at a high load is immediately performed while reducing the load of the base station device 110, by performing the HO threshold derivation with the NMS 200 and performing the high load determination by the base station device 110.

Figure 12:
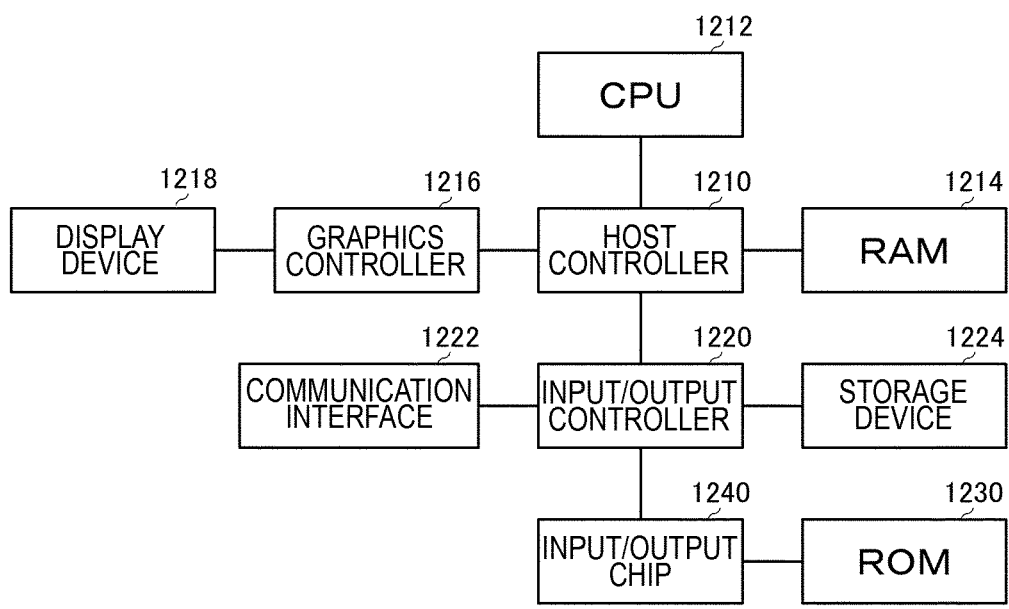
FIG. 12 is a diagram schematically illustrating an example of a hardware configuration of a computer 1200 serving as the base station device 110 or the NMS 200.

FIG. 12 is a diagram schematically illustrating an example of a hardware configuration of a computer 1200 serving as the base station device 110 or the NMS 200. a program installed in the computer 1200 can cause the computer 1200 to function as one or more "units" of the device according to the above embodiment, or can cause the computer 1200 to perform operations or one or more "units" associated with the device according to the above embodiment, and/or can cause the computer 1200 to perform a process or steps of the process according to the above embodiment. Such a program may be executed by a CPU 1212 so as to cause the computer 1200 to perform specific operations associated with some or all of the blocks in the flowcharts and block diagrams described in the present specification.

The computer 1200 according to the present embodiment includes the CPU 1212, a RAM 1214, and a graphics controller 1216 which are mutually connected by a host controller 1210. Also, the computer 1200 includes input/output units such as a communication interface 1222, a storage device 1224, a DVD drive and an IC card drive, which are connected to the host controller 1210 via an input/output controller 1220. The storage device 1224 may be a hard disk drive, a solid state drive and the like. The computer 1200 also includes a legacy input/output unit such as a ROM 1230 and a keyboard, which are connected to the input/output controller 1220 via an input/output chip 1240.

The CPU 1212 operates according to the program stored in the ROM 1230 and the RAM 1214, thereby controlling each unit. The graphics controller 1216 is configured to acquire image data generated by the CPU 1212 in a frame buffer or the like provided in the RAM 1214 or in itself, and cause the image data to be displayed on a display device 1218.

The communication interface 1222 communicates with other devices via a network. The storage device 1224 stores programs and data used by the CPU 1212 in the computer 1200. The IC card drive reads programs and data from an IC card, and/or writes programs and data into the IC card.

The ROM 1230 stores therein boot programs or the like executed by the computer 1200 at the time of activation, and/or stores programs depending on the hardware of the computer 1200. The input/output chip 1240 may also connect various input/output units to the input/output controller 1220 via a USB port, a parallel port, a serial port, a keyboard port, a mouse port or the like.

A program is provided by a computer-readable storage medium such as the DVD-ROM or the IC card. The program is read from the computer-readable storage medium, installed in the storage device 1224, the RAM 1214, or the ROM 1230, which are also examples of the computer-readable storage medium, and is executed by the CPU 1212. Information processing written in these programs is read by the computer 1200, and provides cooperation between a program and the above-mentioned various types of hardware resources. An apparatus or a method may be configured by realizing the operation or processing of the information according to the usage of the computer 1200.

For example, when communication is performed between the computer 1200 and an external device, the CPU 1212 may execute a communication program loaded in the RAM 1214, and instruct the communication interface 1222 to execute communication processing based on processing written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Next, the CPU 1212 may write back the processed data into the external recording medium.

Various types of information, such as various types of programs, data, tables, and databases, may be stored in the recording medium, and subjected to information processing. The CPU 1212 may execute various types of processing on the data read from the RAM 1214 to write back a result to the RAM 1214, the processing being described throughout the present disclosure, specified by instruction sequences of the programs, and including various types of operations, information processing, conditional determinations, conditional branching, unconditional branching, information retrievals/replacements, or the like. In addition, the CPU 1212 may search for information in the file, the database, or the like in the recording medium. For example, when a plurality of entries each having an attribute value of a first attribute associated with an attribute value of a second attribute are stored in the recording medium, the CPU 1212 may search, from the plurality of entries, for an entry that matches a condition in which the attribute value of the first attribute is specified, and read the attribute value of the second attribute stored in the entry, and thereby acquiring the attribute value of the second attribute associated with the first attribute that satisfies a predetermined condition.

The above-described program or software module may be stored on the computer 1200 or in a computer-readable storage medium near the computer 1200. Also, a recording medium such as a hard disk or a RAM provided in a server system connected to a dedicated communication network or the Internet can be used as a computer-readable storage medium, thereby providing the program to the computer 1200 via the network.

In the flowcharts and the block diagrams in the present embodiment, the blocks may represent "units" of an apparatus having a role to perform steps of the process for performing operations or to perform the operations. A specific step or "unit" may be implemented by a dedicated circuit, a programmable circuit provided along with computer-readable instructions stored on a computer-readable storage medium, and/or a processor provided along with the computer-readable instructions stored on the computer-readable storage medium. The dedicated circuit may include a digital and/or analog hardware circuit, or may include an integrated circuit (IC) and/or a discrete circuit. The programmable circuit may include a reconfigurable hardware circuit, such as a field-programmable gate array (FPGA) and a programmable logic array (PLA), for example, including logical AND, logical OR, logical XOR, logical NAND, logical NOR, and other logical operations, flip-flops, registers, and memory elements.

The computer-readable storage medium may include any tangible device that can store instructions to be executed by a suitable device, so that the computer-readable storage medium having instructions stored thereon comprises a product including instructions that can be executed to configure means for performing operations specified in the flowcharts or block diagrams. Examples of the computer-readable storage medium may include an electronic storage medium, a magnetic storage medium, an optical storage medium, an electromagnetic storage medium, a semiconductor storage medium, etc. More specific examples of computer-readable storage media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY(registered trademark) disc, a memory stick, an integrated circuit card, etc.

The computer-readable instructions may include assembler instructions, instruction set architecture (ISA) instructions, machine instructions, machine-dependent instructions, microcodes, firmware instructions, state-setting data, or any of source codes or object codes described in any combination of one or more programming languages, including object-oriented programming languages, such as Smalltalk (registered trademark), JAVA (registered trademark), or C++, and conventional procedural programming languages, such as "c" programming languages or similar programming languages.

The computer-readable instructions may be provided to a processor of a general-purpose computer, a special purpose computer or other programmable data processing apparatuses, or a programmable circuit, locally or via the local area network (LAN) or the wide area network (WAN) such as the Internet, so that the processor of the general-purpose computer, the special purpose computer or other programmable data processing apparatuses, or the programmable circuit executes the computer-readable instructions to generate means for performing the operations specified in the flowcharts or block diagrams. Examples of processors include computer processors, processing units, microprocessors, digital signal processors, controllers, microcontrollers, etc.

The above-described embodiment includes the NMS 200 as an example of the management device, but not limited thereto. The system 10 may include the management device aside from the NMS 200. The management device may be connected to the network 20, and include a measurement report receiving unit 202, a measurement report storing unit 204, an HO threshold deriving unit 206, and an HO threshold transmitting unit 208.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system
20: network
30: user terminal
40: gateway
100: wireless base station
102: cell
104: HO available area
110: base station device
111: HO threshold storing unit
112: terminal control unit
114: measurement report receiving unit
116: HO determining unit
118: measurement report storing unit
120: measurement report transmitting unit
122: HO threshold receiving unit
126: HO threshold deriving unit
128: load determining unit
130: HO threshold change unit
180: wireless base station
200: NMS
202: measurement report receiving unit
204: measurement report storing unit
206: HO threshold deriving unit
208: HO threshold transmitting unit
222: cumulative distribution graph
224: cumulative distribution graph
300: HAPS
310: vehicle
320: central part
322: FL antenna
324: SL antenna
330: propeller
340: pod
350: solar panel
1200: computer
1210: host controller
1212: CPU
1214: RAM
1216: graphics controller
1218: display device
1220: input/output controller
1222: communication interface
1224: storage device
1230: ROM
1240: input/output chip

What is claimed is:

1. A base station device configured to form a cell to provide a wireless communication service to a user terminal within the cell, the base station device comprising:
    a handover threshold storing unit for storing a handover threshold which is set for the user terminal that starts a wireless connection to the base station device,
    a load determining unit for determining whether a load condition is satisfied or not so as to determine whether or not a load of the base station device is high, wherein the load of the base station device is indicated as being high when the load condition is satisfied, and
    a handover threshold change unit for changing the handover threshold so as to suppress a handover from the base station device of a user terminal which establishes a wireless connection with the base station device when it is determined that the load condition is satisfied.

2. The base station device according to claim 1, wherein the load determining unit is configured to determine that the load condition is satisfied when the load of the base station device is higher than a predetermined load threshold, and to determine that the load condition is not satisfied when the load of the base station device is lower than the predetermined load threshold.

3. The base station device according to claim 2, wherein the load determining unit is configured to determine that the load condition is satisfied when a CPU usage rate of the base station device is higher than a predetermined usage rate threshold, and to determine that the load condition is not satisfied when the CPU usage rate of the base station device is lower than the predetermined usage rate threshold.

4. The base station device according to claim 1, wherein the handover threshold change unit is configured to increase, when the load determining unit determines that the load condition is satisfied, the handover threshold for determining whether or not received radio wave intensity from a neighbor cell is stronger than received radio wave intensity from a serving cell by the handover threshold or higher.

5. The base station device according to claim 4, wherein the handover threshold change unit is configured to change the handover threshold from a default value to a first handover threshold higher than the default value when the load determining unit determines that the load condition is satisfied.

6. The base station device according to claim 5, wherein the handover threshold change unit is configured to change the handover threshold to the default value when the load determining unit determines that the load condition is not satisfied after the handover threshold is changed to the first handover threshold.

7. The base station device according to claim 5, wherein the load determining unit is configured to determine that the load condition is satisfied when the load of the base station device is higher than a predetermined first load threshold, the handover threshold change unit is configured to change the handover threshold to the first handover threshold when the load of the base station device is higher than the predetermined first load threshold and lower than a second load threshold which is higher than the predetermined first load threshold, and change the handover threshold to a second handover threshold which is higher than the first handover threshold when the load of the base station device is higher than the second load threshold.

8. The base station device according to claim 7, comprising:

a measurement report receiving unit for receiving a measurement report to report a measurement result of a received radio wave which is generated by the user terminal and transmitted by the user terminal;

a handover determining unit for determining whether or not to handover the user terminal based on the measurement report; and a handover control unit for performing control in order to handover the user terminal which is determined, by the handover determining unit, to be handed over, wherein the handover threshold change unit is configured to use the first handover threshold and the second handover threshold which are determined based on the measurement report when the handover determining unit determines to handover the user terminal.

9. The base station device according to claim 8, comprising:

a measurement report storing unit for storing a measurement report when the handover determining unit determines to handover the user terminal; and a handover threshold deriving unit for deriving the first handover threshold and the second handover threshold based on a plurality of measurement reports stored in the measurement report storing unit.

10. The base station device according to claim 8, comprising:

a measurement report transmitting unit for transmitting, to a management device, a measurement report in a case of the handover determining unit determining to handover the user terminal; and a handover threshold receiving unit for receiving, from the management device, the first handover threshold and the second handover threshold which are derived, by the management device, based on a plurality of the measurement reports.

11. A system comprising:

the base station device according to claim 10; and the management device.

12. The base station device according to claim 1, wherein the base station device is mounted on a flying object.

13. A flying object comprising the base station device according to claim 1, wherein the flying object is configured to:

form the cell on a ground by the base station device to provide a wireless communication service to the user terminal within the cell.

14. A method performed by a base station device configured to form a cell to provide a wireless communication service to a user terminal within the cell, the method comprising:

determining whether a load condition is satisfied or not so as to determine whether or not a load of the base station device is high, wherein the load of the base station device is indicated as being high when the load condition is satisfied; and changing a handover threshold which is set for the user terminal that starts a wireless connection to the base station device so as to suppress a handover from the base station device of a user terminal which establishes a wireless connection with the base station device when it is determined that the load condition is satisfied.

* * * * *